US010997585B1

(12) United States Patent
Krishnamurthy Rao et al.

(10) Patent No.: US 10,997,585 B1
(45) Date of Patent: May 4, 2021

(54) PAYMENT PROCESSING PLATFORM PROVIDING TAB BASED PAYMENT OPTIONS

(71) Applicant: Dell Products L.P., Round Rock, TX (US)

(72) Inventors: Archana Krishnamurthy Rao, Austin, TX (US); Anand R. Pandey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 15/897,454

(22) Filed: Feb. 15, 2018

(51) Int. Cl.
*G06Q 30/00* (2012.01)
*G06Q 20/34* (2012.01)
*G06Q 20/22* (2012.01)
*G06Q 20/26* (2012.01)
*G06Q 20/24* (2012.01)

(52) U.S. Cl.
CPC .......... *G06Q 20/34* (2013.01); *G06Q 20/227* (2013.01); *G06Q 20/24* (2013.01); *G06Q 20/26* (2013.01)

(58) Field of Classification Search
CPC .................................................... G06F 17/60
USPC ..... 705/39, 1.1, 26.1, 14.23, 40, 21; 709/27, 709/26; 364/281.9, 241.9, 401, 403
See application file for complete search history.

(56) References Cited

U.S. PATENT DOCUMENTS

| 6,167,383 | A  | * | 12/2000 | Henson ................ | G06Q 10/087 703/13 |
| 9,934,500 | B2 | * | 4/2018  | Guyot .................... | G06Q 20/20 |
| 9,990,621 | B1 | * | 6/2018  | Ng ........................ | G06Q 20/202 |
| 10,318,992 | B2 | * | 6/2019  | Showers ............ | G06Q 30/0239 |

OTHER PUBLICATIONS

ProQuestDialogNPL Search History.*

* cited by examiner

*Primary Examiner* — John H. Holly
(74) *Attorney, Agent, or Firm* — Ryan, Mason & Lewis, LLP (57) ABSTRACT

An apparatus comprises a processing platform including a plurality of processing devices. The processing platform receives a request to generate a checkout interface on a user device in connection with a transaction to purchase a product and/or a service being performed over one or more networks, wherein the checkout interface comprises a plurality of selectable indicators each respectively indicating a payment option of a plurality of payment options, and to generate the checkout interface on the user device responsive to the request. The plurality of selectable indicators are simultaneously displayed on the checkout interface. The processing platform is further configured to receive a selection of a selectable indicator from the user device, and to automatically display on the checkout interface details of a payment option corresponding to the selected indicator responsive to the selection. The details are simultaneously displayed with the plurality of selectable indicators on the checkout interface.

20 Claims, 9 Drawing Sheets

Checkout

Cart > Guest Checkout > Shipping > Payment > Verify & Submit > Order Submitted

Payment

Boost your purchasing power this season. Get low monthly payments. Apply for financing below.^
$ Learn more

Select method of payment

- Financing
- Credit/Debit Card
- Dell Gift Card
- PayPal

Financing
You can split your purchase between 1-3 forms of payment

Apply for Financing
Increase your purchasing power with special financing offers and low monthly payments.^ Add rewards for up to 6% towards future purchases.^^
Apply and finish checking out

Already have financing?
Finance this order with low monthly payments.^
Continue and pay with your account

Split your payment

Add Another Payment Method $

Order Summary
1 item view cart $202.00 Total Savings

| | |
|---|---|
| Subtotal | $377.98 |
| Shipping | $0.00 |
| Tax | $32.61 |
| Total | $410.59 |

Continue

Norton VeriSign

Verified by VISA   MasterCard
Learn more   Learn more

FIG. 2B

Checkout

Cart — Guest Checkout — Shipping — Payment — Verify & Submit — Order Submitted

Payment

Boost your purchasing power this season. Get low monthly payments. Apply for financing below.^
$ Learn more

Select method of payment

- Financing
- Credit/Debit Card
- Dell Gift Card
- PayPal

Credit/Debit Card
You can split your purchase between 1-3 forms of payment

Card number

*Exp month ▼   *Exp year ▼

Name on card

Security Code
Find your code

Phone number
For security: Use the number on file with your financial institution.

Split your payment

Add Another Payment Method $

Order Summary
1 item view cart $202.00 Total Savings

Subtotal         $377.98
Shipping         $0.00
Tax              $32.61
Total        $410.59

Continue

Verified by VISA  Learn more
MasterCard. Learn more
Norton VeriSign

PAYMENT PROCESSING PLATFORM PROVIDING TAB BASED PAYMENT OPTIONS

FIELD

The field relates generally to information processing systems, and more particularly to a payment processing platform providing tab based payment options for online checkout.

BACKGROUND

Various merchants, service providers and/or enterprises offer online or web-based shopping and payment options enabling a customer to shop and pay for goods and services using online interfaces offered via a website. Conventional online checkout interfaces typically offer payment options through selection on radio or option buttons, or through selection of an option in a drop-down menu or list. Radio or option buttons are graphical control elements that allow a user to choose one of a predefined set of mutually exclusive options. A drop-down menu or list is a graphical control element that allows a user to choose one value from a list. An inactive drop-down menu displays a single value, while an activated drop-down menu displays a list of values, from which a user may select a value. Once selection of a value has been made from the drop-down menu, the drop-down menu returns to its inactive state, displaying the selected value.

The use of radio buttons and drop-down menus in connection with conventional online checkout interfaces requires a large number of clicks (e.g., an affirmative activation step performed by a user utilizing, for example, a mouse, pointer, stylus, finger on a touchscreen, or other appropriate interfacing means), and also does not provide a user with a clear overview of all supported payment types. Navigation between payment types when using conventional online checkout interfaces is also not intuitive.

Accordingly, there is a need for an improved online payment interface which addresses the problems associated with conventional online payment interfaces.

SUMMARY

Illustrative embodiments provide a payment processing platform which can generate and implement an online checkout graphical user interface comprising a plurality of payment options simultaneously displayed in the form of selectable tabs, which is an improvement over conventional online checkout interfaces, by offering a clear and concise way to present available payment options, while reducing a number of actions (e.g., clicks) that a user must execute to process online payment for goods and/or services. In accordance with an embodiment of the present invention, by displaying payment options as adjacent tabs, a user interacting with the interface is clear on all payment types that are supported and is able to easily switch between the tabs by simply selecting a tab. The embodiments of the present invention are also easily scaled to include additional payment options by simply adding additional tabs to represent further payment options. The embodiments of the present invention are further scalable across all form factors, meaning that the embodiments of the present invention can be adapted for use on multiple devices, such as, for exampe, desktop and tablet computing devices and mobile phones.

In one embodiment, an apparatus comprises at least one processing platform including a plurality of processing devices. The processing platform is configured to receive a request to generate a checkout interface on at least one user device in connection with a transaction to purchase at least one of a product and a service being performed over one or more networks, wherein the checkout interface comprises a plurality of selectable indicators each respectively indicating a payment option of a plurality of payment options, and to generate the checkout interface on the at least one user device responsive to the request, wherein the plurality of selectable indicators are simultaneously displayed on the checkout interface. The processing platform is further configured to receive a selection of a selectable indicator from the at least one user device, and to automatically display on the checkout interface details of a payment option corresponding to the selected indicator responsive to the selection, wherein the details are simultaneously displayed with the plurality of selectable indicators on the checkout interface.

These and other illustrative embodiments include, without limitation, apparatus, systems, methods and computer program products comprising processor-readable storage media.

BRIEF DESCRIPTION OF THE DRAWINGS

FIGS. 2A-2E show images of screen displays (screenshots) including an online checkout interface in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

Figure 1:
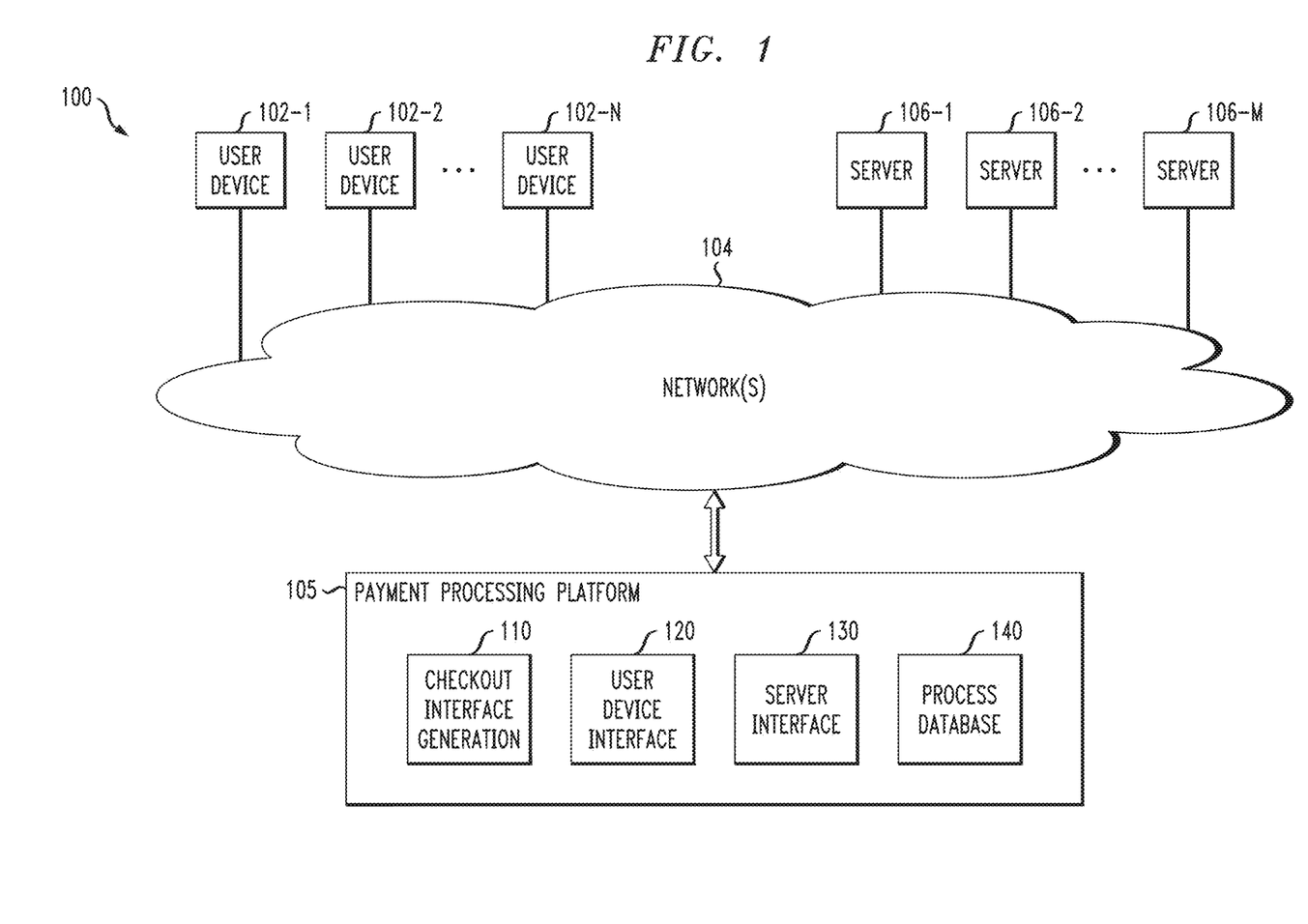
FIG. 1 is a block diagram of an information processing system comprising a payment processing platform configured for providing tab based payment options for online checkout in an illustrative embodiment.

FIG. 1 shows an information processing system 100 configured in accordance with an illustrative embodiment. The information processing system 100 comprises user (e.g., customer) devices 102-1, 102-2, . . . 102-N (collectively user devices 102), and servers 106-1, 106-2, . . . 106-M (collectively servers 106). The user devices 102 and servers 106 communicate over a network 104 with a payment processing platform 105. The variable N and other similar index variables herein such as K, L and M are assumed to be arbitrary positive integers greater than or equal to two.

The user devices 102 can comprise, for example, desktop, laptop or tablet computers, mobile telephones, or other types of processing devices capable of communicating with the payment processing platform 105 over the network 104. The servers 106 may be web servers, application servers, etc. or other types of servers which provide processes used by the payment processing platform 105 and user devices 102. For example, the servers 106 may be web servers associated with, for example, financial institutions, merchants or other enterprises which provide e-commerce services (e.g., payment method verification, product catalog, pricing and availability information) for the payment processing platform 105 and user devices 102, and/or application servers associated with, for example, financial institutions, merchants or other enterprises which provide web-based or other types of applications, services or other functionality for the payment processing platform 105 and user devices 102. In some embodiments, the servers 106 are part of a cloud computing network providing services to users of the user devices 102. The services, applications, functionality or more generally processes provided or otherwise made available to user devices 102 by servers 106 and the payment processing platform 105 vary in complexity as described herein.

The term "user" herein is intended to be broadly construed so as to encompass numerous arrangements of human, hardware, software or firmware entities, as well as combinations of such entities. Payment processing services are assumed to be provided for users under one or more payment processing platforms, although it is to be appreciated that other types of infrastructure arrangements could be used. At least a portion of the available payment processing services in some embodiments may be provided under Function-as-a-Service ("FaaS") and/or Platform-as-a-Service (PaaS) models, including cloud-based FaaS and PaaS environments.

The payment processing platform 105 in the present embodiment is assumed to implement tab based payment options for online checkout and corresponding functionality accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The payment processing platform 105 generates an online checkout graphical user interface comprising tab based payment options for online checkout for respective infrastructure tenants each corresponding to one or more users associated with respective ones of the user devices 102.

According to an embodiment, the infrastructure tenants are cloud infrastructure tenants. The payment processing platform 105 in some embodiments may be implemented as part of cloud infrastructure in the form of a cloud-based system such as an AWS system. Other examples of cloud-based systems that can be used to provide at least portions of the payment processing platform 105 and possibly other portions of system 100 include GCE and Windows Azure®.

The payment processing platform 105 in the embodiment of FIG. 1 illustratively comprises a checkout interface generation module 110, a user device interface module 120, a server interface module 130 and a process database 140.

In more detail, the checkout interface generation module 110 is configured to generate an online checkout graphical user interface including selectable payment options simultaneously displayed as tabs on an interface displayed, for example, on a screen of a user device 102. In accordance with an embodiment of the present invention, the selection of a payment option tab using, for example, an interfacing element, including, but not necessarily limited to, a computer mouse, stylus, a pointer, a keyboard or a finger on a touchscreen, displays details of the payment option and/or entry fields for inputting payment information. Upon selection of a payment option tab, the simultaneous display of each of the available payment option tabs remains on the screen. In other words, selection of a payment option does not hide remaining available payment options.

In accordance with an embodiment of the present invention, the checkout interface generation module 110, by querying the servers 106 and/or utilizing information stored in the process database 140, generates selectable visual indicators of payment (e.g. tabs), along with other interface features for presentation on a display of a user device 102 in association with an online checkout process occurring in connection with the purchase of goods and/or services online.

The interface including the selectable visual indicators, is generated by the checkout interface generation module 110 of the payment processing platform, and is presented on a display of a user device 102 as a user (e.g., a customer) via the user device 102 is completing a given checkout process. The appearance of the interface updates or changes in response to the user selecting certain options and/or inputting information via the interface. The payment processing platform 105 is further configured to process payment for a product and/or service being purchased using a selected payment option. This may require communication over a network 104 with one or more servers 106 to verify and approve a financial transaction with the selected payment method, and/or to process a remainder of the order with the seller.

In some embodiments, the checkout interface generated by the checkout interface generation module 110 is implemented as a script (e.g., in a web browser or other application on the user devices 102 or on servers 106), and/or as an application programming interface (API) on one or both of the user devices 102 and servers 106. Further, in some embodiments the interface generated by the checkout interface generation module 110 may be implemented internally to one of the user devices 102. The process database 140 may similarly be implemented internal to one or more of the user devices 102, visual interface generation module 110 and servers 106.

The process database 140 may store information relating to various processes (e.g., number and type of sub-processes, tasks or other steps in a process, input or other action required to complete designated types of sub-processes, tasks or other steps, etc.). The process database 140 may also store information for one or more of the user devices 102 (or for particular users thereof) for completing designated types of sub-processes, tasks or other steps. For example, the process database 140 may store different types of address (e.g., home and shipping addresses) and financial information (e.g., credit card information) for a user.

The process database 140 may include a database service, such as, but not necessarily limited to GCE Cloud Storage, Microsoft Azure Blob (Binary Large Object) Storage, DynamoDB, MongoDB, Amazon Aurora and Oracle database. Although the process database in the present embodiment is shown as part of the payment processing platform 105, at least a portion of the process database 140 in other embodiments may be implemented on one or more other processing platforms that are accessible to the payment processing platform 105 over one or more networks.

In the FIG. 1 embodiment, the process database 140 is assumed to comprise one or more storage systems configured to store information relating to processing performed and data used in the checkout interface generation module 110, and the user device and server interface modules 120 and 130, and relating to other functionality of the payment processing platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of payment processing platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The user device and server interface modules 120 and 130 include appropriate network interface circuitry, which is used to interface the payment processing platform 105 with the network 104 and user devices 102 and servers 106, respectively, and may comprise conventional transceivers.

It is assumed that the payment processing platform 105 and servers 106 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the servers 106, the checkout interface generation module 110, the user device and server interface modules 120 and 130, the process database 140 and the elements thereof can each be implemented in the form of one or more LXCs running on one or more VMs. Other arrangements of one or more processing devices of a processing platform can be used to implement the servers 106, the checkout interface generation module 110, the user device and server interface modules 120 and 130 and the process database 140 as well as other components of the payment processing platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the payment processing platform 105 to reside in different data centers. Numerous other distributed implementations of the payment processing platform 105 are possible.

Accordingly, one or each of the servers 106, the checkout interface generation module 110, the user device and server interface modules 120 and 130 and the process database 140 can each be implemented in a distributed manner so as to comprise a plurality of distributed components implemented on respective ones of the plurality of compute nodes of the payment processing platform 105.

Although illustratively shown as being implemented within the payment processing platform 105, the checkout interface generation module 110, the user device and server interface modules 120 and 130, the process database 140 and the elements thereof in other embodiments can be implemented at least in part externally to the payment processing platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as the servers 106, the checkout interface generation module 110, the user device and server interface modules 120 and 130, the process database 140 and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for the payment processing platform 105 can be offered to cloud infrastructure customers or other users as part of FaaS and/or PaaS offerings.

Figure 2A:
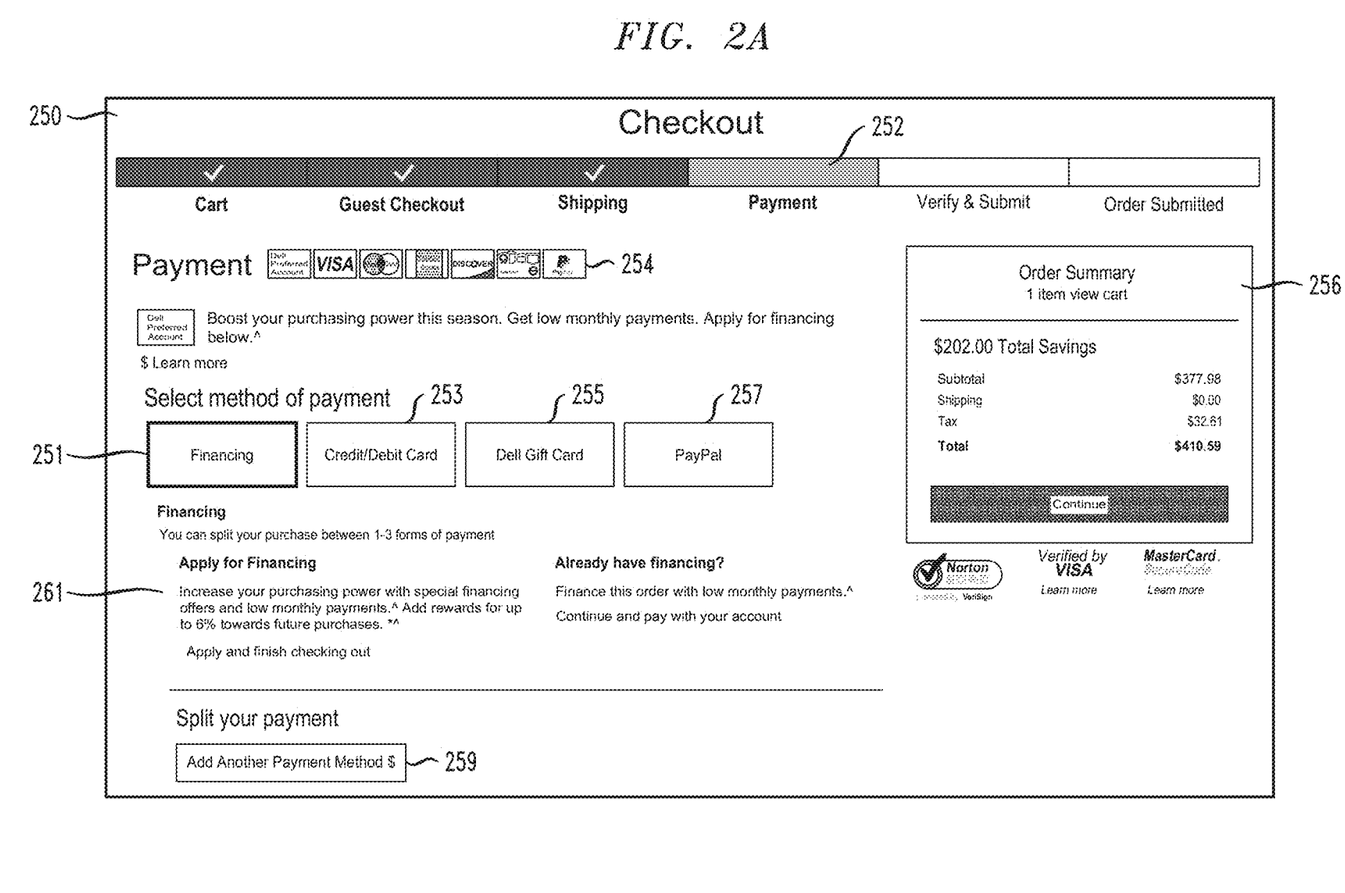
Figure 2C:
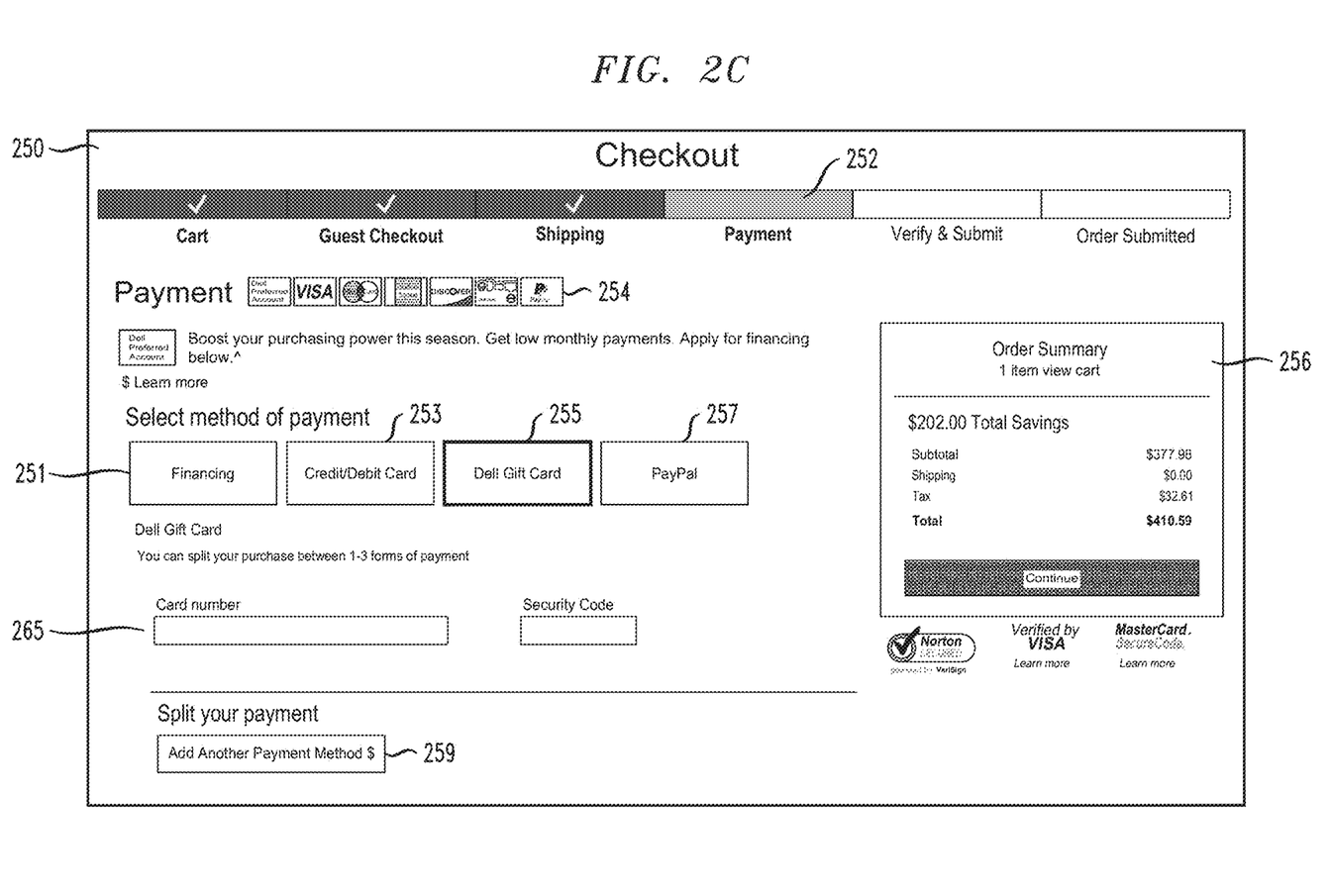
Figure 2D:
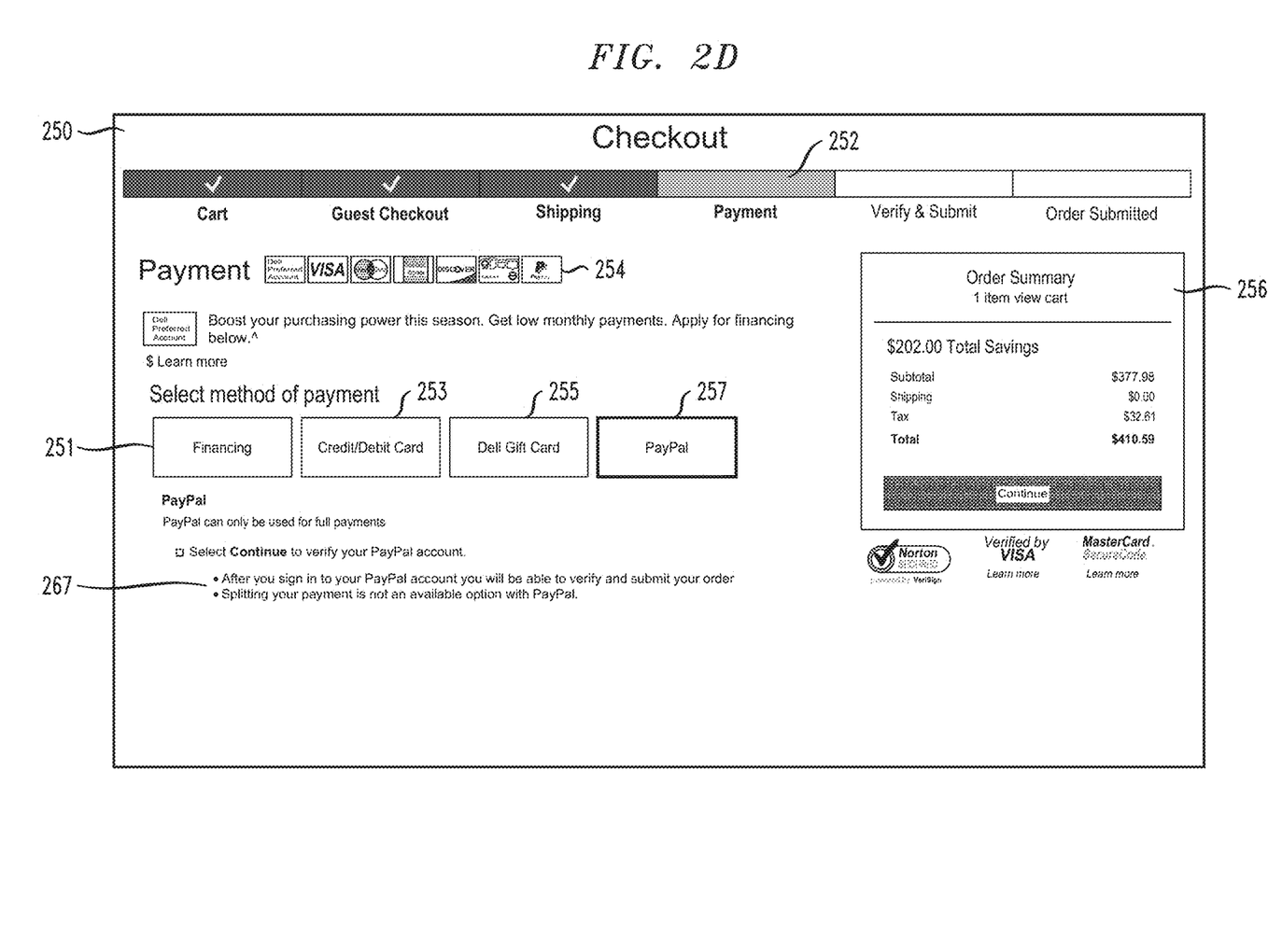

FIGS. 2A-2E show images of screen displays (screenshots) including an online checkout interface in an illustrative embodiment. Referring to FIGS. 2A-2D, an online checkout graphical user interface 250 generated and implemented on a user device 102 by the checkout interface generation module 110 includes a plurality of selectable visual indicators (referred to herein as "tabs") 251, 253, 255 and 257 representing various forms of payment in an online checkout scenario. The illustrated tabs are in the form respective rectangular boxes, but the embodiments of the present invention are not necessarily limited thereto. For example, the embodiments of the present invention include other shapes or formats for the tabs 251, 253, 255 and 257, such as but not necessarily limited to ovals, circles, squares, or other types of icons or images respectively representing each form of payment. Tabs 251, 253, 255 and 257 respectively indicate, for example, "Financing," "Credit/Debit Card," "Gift Card" and "PayPal®," as payment options. The embodiments of the present invention are not limited to the displayed payment options, and can include different combinations of payment options and/or more or less options than what is shown. As can be seen, the payment option tabs 251, 253, 255 and 257 are simultaneously displayed adjacent to each other on the interface 250. The tabs 251, 253, 255 and 257, when clicked on, using, for example, a mouse (or pointer, stylus, finger on a touchscreen, etc.) provide users with expanded functionality related to making a payment associated with a payment option on each tab. For example, referring to FIG. 2A, when tab 251 is selected, options for applying for financing 261 are displayed. Referring to FIG. 2B, when tab 253 is selected, fields 263 for filling in credit/debit card information are displayed. Referring to FIG. 2C, when tab 255 is selected, fields 265 for filling in gift card information are displayed. Referring to FIG. 2D, when tab 257 is selected, options 267 in connection with processing payment and submitting the order through a payment service, such as, but not necessarily limited to, PayPal® are displayed. With each of the tab selections as shown in FIGS. 2A-2D, the interface 250 continues to display each of the tabs 251, 253, 255 and 257, which remain selectable by a user via a user device 102 while displaying any of the fields 261, 263, 265 and 267 associated with a selected tab 251, 253, 255 or 257.

Referring to FIGS. 2A-2D, the interface 250 further includes an indication of a stage 252 of the transaction, for example, "payment," "shipping," "guest checkout selection," "verify and submit," etc., an indication 254 of financial institutions and/or payment services which are accepted by the online merchant, and an order summary portion 256 indicating online shopping cart contents, price and, optionally, shipping information, such as estimated delivery date. As can be seen, each of the items 252, 254 and 256 are displayed at the same time as the payment option tabs and a field associated with a selected payment option. FIGS. 2A-2E represent an interface 250 in connection with a guest checkout scenario, where the user has not created an account with the merchant. The embodiments of the present invention are not limited to a guest checkout scenario, and as can be seen in connection with FIG. 3 discussed herein below, the embodiments of the present invention are also applicable to a checkout performed by a registered user.

Figure 2E:
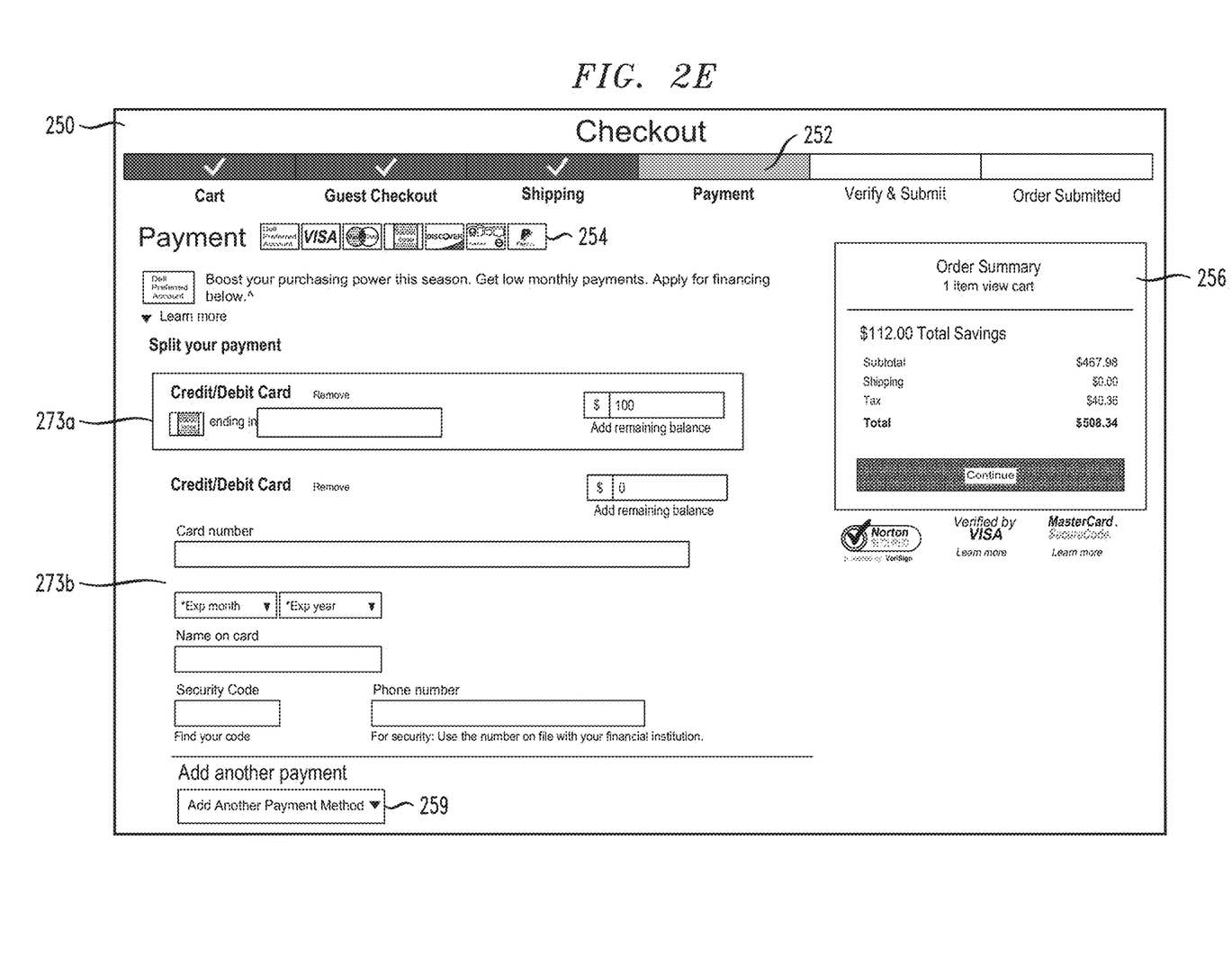

The interface 250 further includes a selectable option 259 (e.g., button, icon, etc.) to split the payment between more than one available payment method. Referring to FIG. 2E, when the split payment option is selected, the interface 250 displays a first payment option 273*a* (in this case a credit/debit card) with the details of the first payment option, and a second payment option 273*b* (also a credit/debit card in this case) with fields to enter the information for the second payment option. The interface further allows a user to input amounts to be charged to each payment option 273*a* and 273*b*.

As users of the user devices 102 select the different options (e.g., tabs 251, 253, 255 or 257), features of the interface (e.g., portions 261, 263, 265 and 267) change to allow a user to proceed with the selected method of payment. In connection with each selection on the interface or input made by a user on the interface 250, the payment processing platform 105 generates the appropriate content on the interface to correspond with the user selection or input. The generation of the appropriate content may require the payment processing platform 105 to communicate with and/or access data and/or scripts from one or more servers 106, or have the servers 106 perform further processes in connection with a user's selection. For example, the payment processing platform 105 may communicate over the network 104 with a server 106 of a financial institution or payment service to verify inputted payment information. The payment processing platform 105 may also access the process database 140 or communicate with a merchant server to access saved customer address and financial information, or access product pricing and availability information.

The simultaneous display of payment options in the form of selectable tabs 251, 253, 255 and 257 permits a user to execute a single activation action (e.g., click) to switch/toggle between different payment options, while continuing to display and provide access to each available payment option. For example, a user can select to use a credit/debit card by selecting tab 253 in a single action (e.g., click), and while viewing or filling in the credit/debit card information in, for example, field 263, the user can perform a single click on another available tab 251, 255 or 257 to select or view further details corresponding to a different payment option. Alternatively, after taking the necessary steps to use a selected payment option (e.g., filling in credit/debit card information in available fields), the user can select the split payment option 259 to add another payment option. In accordance with an embodiment of the present invention, by displaying payment options as adjacent tabs 251, 253, 255 and 257, a user interacting with the interface 250 is clear on all payment types that are supported and is able to easily switch between the tabs by simply selecting a tab. The embodiments of the present invention are also easily scaled to include additional payment options by simply adding additional tabs to represent further payment options.

Figure 3:
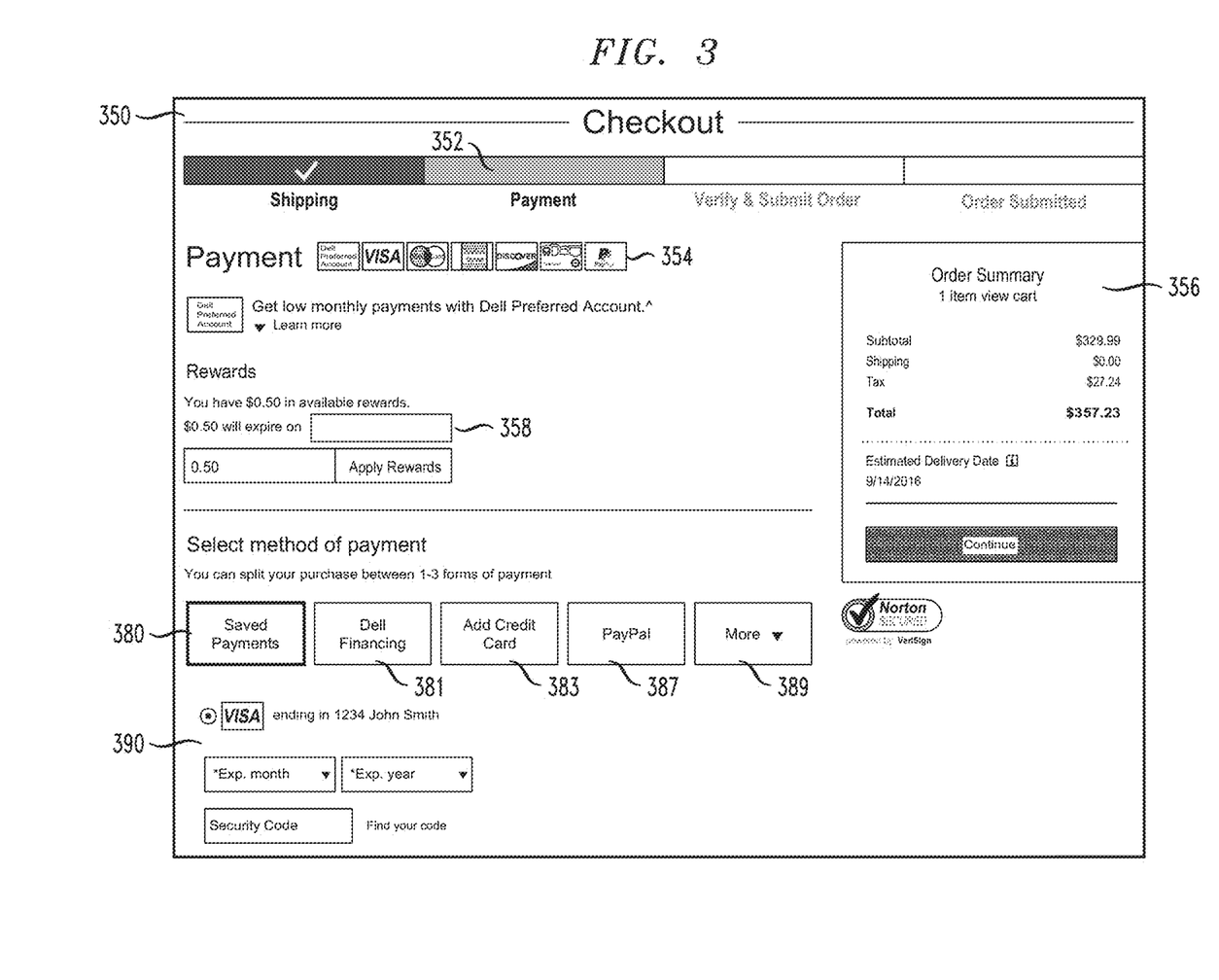
FIG. 3 shows an image of a screen display (screenshots) including an online checkout interface in an illustrative embodiment.

FIG. 3 shows an image of a screen display (screenshots) including an online checkout interface in an illustrative embodiment. Referring to FIG. 3, an online checkout graphical user interface 350 in connection with a user having a registered account with an online merchant, is generated and implemented on a user device 102 by the checkout interface generation module 110, and includes a plurality of selectable visual indicators ("tabs") 380, 381, 383 and 387 representing various forms of payment in an online checkout scenario. Similar to what is described in connection with FIGS. 2A-2E, the illustrated tabs are in the form respective rectangular boxes, but the embodiments of the present invention are not necessarily limited thereto and may include other shapes or formats respectively representing each form of payment. Tabs 380, 381, 383 and 387 respectively indicate, for example, "Saved Payments," "Financing," "Add Credit Card," and "PayPal®," as payment options. The embodiments of the present invention are not limited to the displayed payment options, and can include different combinations of payment options and/or more or less options than what is shown. As can be seen, the payment option tabs 380, 381, 383 and 387 are simultaneously displayed adjacent to each other on the interface 350. The tabs 380, 381, 383 and 387, when clicked on, using, for example, a mouse (or pointer, stylus, finger on a touchscreen, etc.) provide users with expanded functionality related to making a payment associated with a payment option on each tab. For example, referring to FIG. 3, when tab 380 is selected, options for using payment mechanisms which have been saved in connection with the registered user's account are displayed, including fields 390 where the user can input remaining information associated with a saved payment mechanism, like a credit or debit card. Saved data in connection with a saved payment mechanism can be accessed, for example, from the process database 140 and/or from one of the servers 106, which is being used by, for example, an online merchant. When tab 381 is selected, options for applying for financing are displayed. When tab 383 is selected, fields for filling in credit/debit card information for a new card added to the user account are displayed. When tab 387 is selected, options in connection with processing payment and submitting the order through a payment service, such as, but not necessarily limited to, PayPal® are displayed. In addition, FIG. 3 includes an optional "More" tab 389, which can include a drop down menu with additional methods of payment that can be selected by a user to process payment in an online purchasing transaction. Alternatively, the "More" tab 389 is not included in the interface 350. With each of the tab selections as shown in FIG. 3, the interface 350 continues to display each of the tabs 380, 381, 383, 387 and 389, which remain selectable by a user via a user device 102 while displaying any of the fields associated with a selected tab 380, 381, 383, 387 or 389.

Referring to FIG. 3, the interface 350 further includes an indication of a stage 352 of the transaction, for example, "payment," "shipping," "verify and submit," etc., an indication 354 of financial institutions and/or payment services which are accepted by the online merchant, and an order summary portion 356 indicating online shopping cart contents, price and, optionally, shipping information, such as estimated delivery date. As can be seen, each of the items 352, 354 and 356 are displayed at the same time as the payment option tabs and a field associated with a selected payment option. As noted above, FIG. 3 represents an interface 350 in connection with a registered user checkout scenario, where the user has created an account with the merchant. The embodiments of the present invention are not limited to a registered user checkout scenario, and as can be seen in connection with FIGS. 2A-2E discussed herein above, the embodiments of the present invention are also applicable to a checkout performed by a non-registered (guest) user.

The interface 350 further includes a selectable option 358 (e.g., icon, button, etc.) to use one or more rewards (e.g., price reduction incentives, for example, based on past purchases) associated with the account of a registered user, which can be applied toward payment of the goods and/or services being purchased. As can be seen, the rewards option 358 is displayed at a same time as each of the payment option tabs 380, 381, 383, 387 and the "More" tab 389, as well being displayed at the same time as the details (e.g., portions 390) associated with the selection of one of the tabs for a form of payment.

As users of the user devices 102 select the different options (e.g., tabs 380, 381, 383 or 387), features of the interface (e.g., portion 390) change to allow a user to proceed with the selected method of payment. In connection with each selection on the interface or input made by a user on the interface 350, the payment processing platform 105 generates the appropriate content on the interface to correspond with the user selection or input. The generation of the appropriate content may require the payment processing platform 105 to communicate with and/or access data and/or scripts from one or more servers 106, or have the servers 106 perform further processes in connection with a user's selection. For example, the payment processing platform 105 may communicate over the network 104 with a server 106 of a financial institution or payment service to verify inputted payment information. The payment processing platform 105 may also access the process database 140 or communicate a merchant server to access saved customer address and financial information, or access product pricing and availability information.

The simultaneous display of payment options in the form of selectable tabs 380, 381, 383 and 387 permits a user to execute a single action (e.g., click) to toggle between different payment options, while continuing to display and provide access to each available payment option, as well as continuing to display a "More" tab 389. For example, a user can select to use a saved credit/debit card by selecting tab 380 in a single action (e.g., click), and while viewing or filling in the credit/debit card information in, for example, field 390, the user can perform a single click on another available tab 381, 383 or 387 to select or view further details corresponding to a different payment option, or click on the "More" tab 389 to view additional payment options in a drop down menu. In accordance with an embodiment of the present invention, by displaying payment options as adjacent tabs 380, 381, 383 and 387, a user interacting with the interface 350 is clear on all payment types that are supported and is able to easily switch between the tabs by simply selecting a tab. The embodiments of the present invention are also easily scaled to include additional payment options by simply adding additional tabs to represent further payment options.

The operation of the information processing system 100 will now be described in further detail with reference to the flow diagram of FIG. 4. The process as shown includes steps 401 through 407, and is suitable for use in the system 100 but is more generally applicable to other types of information processing systems comprising payment processing services platforms configured for providing tab based payment options for online checkout.

In step 401, a request is received, for example, at the payment processing platform 105, to generate a checkout interface (e.g. interface 250 or 350) on at least one user device (e.g., a user device 102) in connection with a transaction to purchase a product and/or a service being performed online over one or more networks. The checkout interface comprises a plurality of selectable indicators (e.g., tabs) each respectively indicating a payment option of a plurality of payment options.

In step 403, the checkout interface is generated on the at least one user device responsive to the request. The plurality of selectable indicators are simultaneously displayed on the checkout interface. In steps 405 and 407, a selection of a selectable indicator is received from the at least one user device, and the details of a payment option corresponding to the selected indicator are automatically displayed on the checkout interface responsive to the selection. The selection of the selectable indicator is performed via a single activation action including, but not necessarily limited to, a mouse operation (e.g., click), a keystroke, a touchscreen input or a stylus input.

The details are simultaneously displayed with the plurality of selectable indicators on the checkout interface. In accordance with an embodiment of the present invention, the details comprise one or more input fields (e.g., credit card information fields) for receiving payment information inputted via the at least one user device The payment processing platform 105 can be configured to receive a second selection of a second selectable indicator (e.g., another tab) from the at least one user device while displaying the details of the payment option corresponding to the selected indicator. The payment processing platform 105 can switch to a display on the checkout interface of details of a second payment option corresponding to the selected second indicator responsive to the second selection. The details of the second payment option are simultaneously displayed with the plurality of selectable indicators on the checkout interface, and the switch responsive to the second selection is performed via a single activation action.

A given payment option of the plurality of payment options comprises, but is not necessarily limited to, a financing option, a credit or debit card option, a gift card option, a saved payment option and a payment service option.

In accordance with an embodiment of the present invention, the payment processing platform 105 is also configured to display on the checkout interface a selectable option to split payment between two or more payment options, wherein the selectable option to split payment is simultaneously displayed with the plurality of selectable indicators on the checkout interface. The selectable option to split payment can be further simultaneously displayed with the details of the payment option corresponding to the selected indicator.

The payment processing platform can be further configured to process payment for the product and/or service being purchased using a selected payment option, and to simultaneously display on the checkout interface a selectable option to apply one or more seller rewards with the plurality of selectable indicators.

Figure 4:
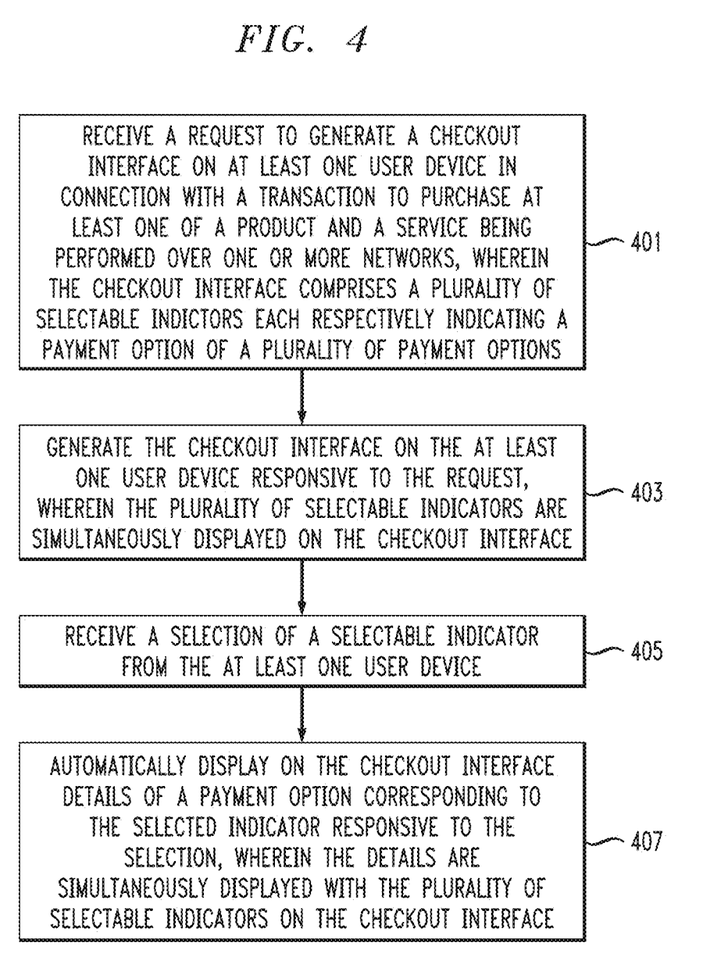
FIG. 4 is a flow diagram of a process utilizing a payment processing platform to provide tab based payment options for online checkout in an illustrative embodiment.

It is to be appreciated that the FIG. 4 process and other features and functionality described above can be adapted for use with other types of information systems configured for providing tab based payment options for online checkout on a payment processing platform or other type of processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a payment processing platform as disclosed herein can provide a number of significant advantages relative to conventional arrangements. For example, the payment processing platform in accordance with embodiments of the present invention advantageously provides a payment processing platform which can generate and implement an online checkout graphical user interface which includes a plurality of simultaneously displayed selectable tabs corresponding to a plurality of payment options. In order to display details of a payment option, including input fields, a user need only perform one affirmative activation action (e.g., mouse click) on one of the displayed selectable tabs. In addition, since the selectable tabs remain displayed while details of a selected tab are displayed, a user need only perform another single affirmative activation action on another selectable tab to view the details corresponding to that selectable tab (e.g., another payment option). Accordingly, the continuous simultaneous display of the selectable tabs representing payment options, as well as the simultaneous display of details of a selected payment option with the plurality of selectable tabs, reduces the number of affirmative activation actions needed to toggle through details of payment options when compared with conventional methods, making more efficient use of computing and memory resources. For example, the reduction in affirmative activation actions improves computing systems by requiring less processing and memory to perform the similar tasks than with conventional interfaces. Moreover, the simultaneous display of the payment option tabs in the online checkout interface of the embodiments of the present invention is an improvement over conventional online checkout interfaces, by offering a clear and concise way to present all available payment options on a single display instead of requiring loading of different displays to view different payment options, which further reduces a number of actions (e.g., clicks) that a user must execute to process online payment for goods and/or services, and further reduces the amount of processing and memory needed to perform the similar tasks on conventional interfaces. In accordance with an embodiment of the present invention, the display of payment options as adjacent tabs provides clarity on all supported payment types in a single display, and enables a user interacting with the interface to easily switch between the tabs by simply selecting a tab. The embodiments of the present invention are also scalable to include additional payment options by simply adding additional tabs to represent further payment options.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the payment processing platform 105 or portions thereof are illustratively implemented for use by tenants of such a multi-tenant environment.

As mentioned previously, cloud infrastructure as disclosed herein can include cloud-based systems such as AWS, GCE and Windows Azure. Virtual machines provided in such systems can be used to implement at least portions of one or more of a computer system and a content addressable storage system in illustrative embodiments. These and other cloud-based systems in illustrative embodiments can include object stores such as AWS S3, GCE Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing payment processing of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
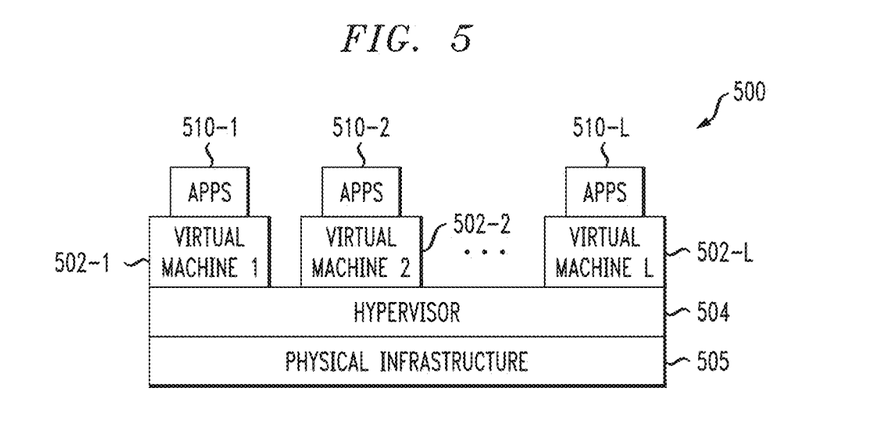
FIGS. 5 and 6 show examples of processing platforms that may be utilized to implement at least a portion of an information processing system in illustrative embodiments.
Figure 6:
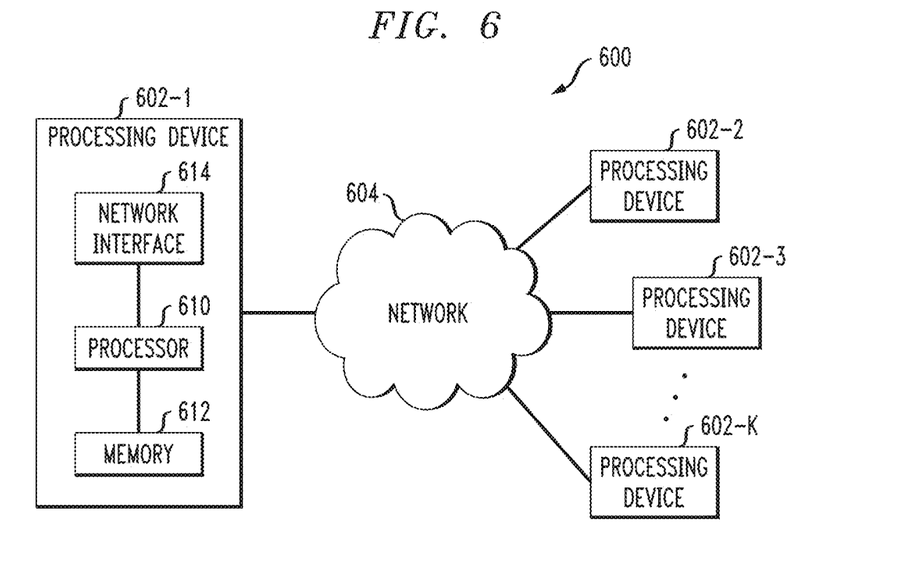

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the payment processing platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and payment processing platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive a request to generate a checkout graphical user interface for at least one user device in connection with a transaction to purchase at least one of a product and a service being performed over one or more networks, wherein the checkout graphical user interface comprises a plurality of selectable indicators each respectively indicating a payment option of a plurality of payment options;
to generate the checkout graphical user interface for the at least one user device responsive to the request, wherein the plurality of selectable indicators are simultaneously displayed on the checkout graphical user interface;
to receive, via the one or more networks, a selection of a selectable indicator from the at least one user device;
to automatically configure the checkout graphical user interface to display a plurality of fields for a payment option corresponding to the selected indicator responsive to the selection, wherein the plurality of fields are configured to be simultaneously displayed with the plurality of selectable indicators on the checkout graphical user interface, and wherein the plurality of fields and the plurality of selectable indicators are configured to be visible and accessible by a user of the at least one user device at the same time on the same screen;
to receive, via the one more networks, an input from the at least one user device for one or more of the plurality of fields;
to communicate, via the one or more networks, with at least one server to access at least one of data and scripts from the at least one server responsive to the input;
to automatically configure the checkout graphical user interface based on at least one of the accessed data and scripts;

to receive a plurality of further selections for each of remaining ones of the plurality of selectable indicators from the at least one user device;

to cause switching between displays on the checkout graphical user interface of details of respective payment options corresponding to each of the remaining ones of the plurality of selectable indicators responsive to the plurality of further selections;

wherein each of the plurality of further selections comprises a single activation action on a remaining one of the plurality of selectable indicators made by the user via the at least one user device and causes the switching between the displays of the details of the respective payment options; and wherein the checkout graphical user interface is configured to simultaneously display the details of the respective payment options with the plurality of selectable indicators;

to detect a change in a number of the plurality of payment options and a number of the plurality of selectable indicators to be displayed on the checkout graphical interface; and to automatically scale a layout of the checkout graphical interface responsive to the detected changes.

2. The apparatus of claim 1 wherein the single activation action comprises at least one of a mouse operation, a keystroke, a touchscreen input and a stylus input.

3. The apparatus of claim 1 wherein said at least one processing platform is further configured to receive each of the plurality of further selections while a plurality of fields for a payment option corresponding to a previously selected indicator are displayed on the checkout graphical user interface.

4. The apparatus of claim 1 wherein the plurality of fields comprise one or more input fields for receiving payment information inputted via the at least one user device.

5. The apparatus of claim 1 wherein a given payment option of the plurality of payment options comprises one of a financing option, a credit or debit card option, a gift card option, a saved payment option and a payment service option.

6. The apparatus of claim 1 wherein said at least one processing platform is further configured to automatically configure the checkout graphical user interface to display a selectable option to split payment between two or more payment options.

7. The apparatus of claim 6 wherein the selectable option to split payment is configured to be simultaneously displayed with the plurality of selectable indicators on the checkout graphical user interface.

8. The apparatus of claim 7 wherein the selectable option to split payment is further configured to be simultaneously displayed with the plurality of fields for the payment option corresponding to the selected indicator.

9. The apparatus of claim 1 wherein said at least one processing platform is further configured to process payment for at least one of the product and the service being purchased using a selected payment option.

10. The apparatus of claim 1 wherein said at least one processing platform is further configured to automatically configure the checkout graphical user interface to display a selectable option to apply one or more seller rewards with the plurality of selectable indicators.

11. A method comprising:

receiving a request to generate a checkout graphical user interface for at least one user device in connection with a transaction to purchase at least one of a product and a service being performed over one or more networks, wherein the checkout graphical user interface comprises a plurality of selectable indicators each respectively indicating a payment option of a plurality of payment options;

generating the checkout graphical user interface for the at least one user device responsive to the request, wherein the plurality of selectable indicators are simultaneously displayed on the checkout graphical user interface;

receiving, via the one or more networks, a selection of a selectable indicator from the at least one user device;

automatically configuring the checkout graphical user interface to display a plurality of fields for a payment option corresponding to the selected indicator responsive to the selection, wherein the plurality of fields are configured to be simultaneously displayed with the plurality of selectable indicators on the checkout graphical user interface, and wherein the plurality of fields and the plurality of selectable indicators are configured to be visible and accessible by a user of the at least one user device at the same time on the same screen;

receiving, via the one more networks, an input from the at least one user device for one or more of the plurality of fields;

communicating, via the one or more networks, with at least one server to access at least one of data and scripts from the at least one server responsive to the input;

automatically configuring the checkout graphical user interface based on at least one of the accessed data and scripts;

receiving a plurality of further selections for each of remaining ones of the plurality of selectable indicators from the at least one user device;

causing switching between displays on the checkout graphical user interface of details of respective payment options corresponding to each of the remaining ones of the plurality of selectable indicators responsive to the plurality of further selections;

wherein each of the plurality of further selections comprises a single activation action on a remaining one of the plurality of selectable indicators made by the user via the at least one user device and causes the switching between the displays of the details of the respective payment options; and wherein the checkout graphical user interface is configured to simultaneously display the details of the respective payment options with the plurality of selectable indicators;

detecting a change in a number of the plurality of payment options and a number of the plurality of selectable indicators to be displayed on the checkout graphical interface; and automatically scaling a layout of the checkout graphical interface responsive to the detected changes;

wherein the method is performed by at one processing platform comprising at least one processing device comprising a processor coupled to a memory.

12. The method of claim 11 wherein the single activation action comprises at least one of a mouse operation, a keystroke, a touchscreen input and a stylus input.

13. The method of claim 11 further comprising receiving each of the plurality of further selections while a plurality of fields for a payment option corresponding to a previously selected indicator are displayed on the checkout graphical user interface.

14. A computer program product comprising a non-transitory processor-readable storage medium having stored therein program code of one or more software programs, wherein the program code when executed by at least one processing platform causes said at least one processing platform:

to receive a request to generate a checkout graphical user interface for at least one user device in connection with a transaction to purchase at least one of a product and a service being performed over one or more networks, wherein the checkout graphical user interface comprises a plurality of selectable indicators each respectively indicating a payment option of a plurality of payment options;

to generate the checkout graphical user interface for the at least one user device responsive to the request, wherein the plurality of selectable indicators are simultaneously displayed on the checkout graphical user interface;

to receive, via the one or more networks, a selection of a selectable indicator from the at least one user device;

to automatically configure the checkout graphical user interface to display a plurality of fields for a payment option corresponding to the selected indicator responsive to the selection, wherein the plurality of fields are configured to be simultaneously displayed with the plurality of selectable indicators on the checkout graphical user interface, and wherein the plurality of fields and the plurality of selectable indicators are configured to be visible and accessible by a user of the at least one user device at the same time on the same screen;

to receive, via the one more networks, an input from the at least one user device for one or more of the plurality of fields;

to communicate, via the one or more networks, with at least one server to access at least one of data and scripts from the at least one server responsive to the input;

to automatically configure the checkout graphical user interface based on at least one of the accessed data and scripts;

to receive a plurality of further selections for each of remaining ones of the plurality of selectable indicators from the at least one user device;

to cause switching between displays on the checkout graphical user interface of details of respective payment options corresponding to each of the remaining ones of the plurality of selectable indicators responsive to the plurality of further selections;

wherein each of the plurality of further selections comprises a single activation action on a remaining one of the plurality of selectable indicators made by the user via the at least one user device and causes the switching between the displays of the details of the respective payment options; and wherein the checkout graphical user interface is configured to simultaneously display the details of the respective payment options with the plurality of selectable indicators;

to detect a change in a number of the plurality of payment options and a number of the plurality of selectable indicators to be displayed on the checkout graphical interface; and to automatically scale a layout of the checkout graphical interface responsive to the detected changes.

15. The computer program product of claim 14 wherein the single activation action comprises at least one of a mouse operation, a keystroke, a touchscreen input and a stylus input.

16. The computer program product of claim 14 wherein the program code further causes said at least one processing platform to receive each of the plurality of further selections while a plurality of fields for a payment option corresponding to a previously selected indicator are displayed on the checkout graphical user interface.

17. The computer program product of claim 14 wherein the program code further causes said at least one processing platform to automatically configure the checkout graphical user interface to display a selectable option to split payment between two or more payment options.

18. The computer program product of claim 17 wherein the selectable option to split payment is configured to be simultaneously displayed with the plurality of selectable indicators on the checkout graphical user interface.

19. The method of claim 11 further comprising automatically configuring the checkout graphical user interface to display a selectable option to split payment between two or more payment options.

20. The method of claim 19 wherein the selectable option to split payment is configured to be simultaneously displayed with the plurality of selectable indicators on the checkout graphical user interface.

* * * * *